United States Patent [19]

Lemmens

[11] 3,801,343

[45] Apr. 2, 1974

[54] PREPARATION OF GRANULAR AGGREGATE FOR USE IN CONCRETE OBJECTS AND STRUCTURES

[75] Inventor: Jan C. Lemmens, Beek (L), Netherlands

[73] Assignee: Stamicarbon N.V., Heerlan, Netherlands

[22] Filed: Feb. 25, 1972

[21] Appl. No.: 229,587

Related U.S. Application Data

[63] Continuation of Ser. No. 40,383, May 25, 1970, abandoned.

[52] U.S. Cl. ............................ 106/288 B, 106/40 R
[51] Int. Cl. ............................................ C08h 17/02
[58] Field of Search ........... 106/40 R, 67, 68, 288 B

[56] References Cited
UNITED STATES PATENTS

| | | | |
|---|---|---|---|
| 2,670,298 | 2/1954 | Froksaer-Sensen et al. | 106/40 |
| 2,699,409 | 1/1955 | Hashimoto | 117/100 |
| 2,706,844 | 4/1955 | Nicholson | 25/156 |

Primary Examiner—Delbert E. Gantz
Assistant Examiner—S. Berger
Attorney, Agent, or Firm—Cushman, Darby & Cushman

[57] ABSTRACT

The invention relates to a process of preparing a lightweight granular aggregate for use in concrete objects and structures, by an intimately mixing a clayey material with materials that help to reduce the weight, granulating this mixture and then heating the granules at least to the temperature at which their mass expands. Use is made of a combination of two known auxiliary materials, the first being a porous inorganic material with open pores, added in an amount of 10–20 percent by volume with respect to the clayey material, and substantially having a grain size below 2 mm., and the second consisting of one or more substances that, upon heating, yield gaseous components at a temperature over 800° C. Use is made of a porous inorganic material having a softening temperature equal to or lower than that of the clayed material.

2 Claims, No Drawings

PREPARATION OF GRANULAR AGGREGATE FOR USE IN CONCRETE OBJECTS AND STRUCTURES

This is a continuation, of application Ser. No. 40,383, filed May 25, 1970, now abandoned.

The present invention relates to a process of preparing a granular aggregate for use in light-weight concrete objects and structures, by intimately mixing a clayey material with materials that help to reduce the weight, granulating this mixture, and then heating the granules at least to the temperature at which their mass expands. The term "Clayey material" as used here denotes a material at least half of which consists of clay minerals, the non-clayey component being constituted mainly by minute quartz particles. "Clayey material" also includes fine-grained materials obtained from shale or slate by grinding or formed therefrom as a result of weathering.

As is well known, expanded, and hence lightweight, granules consisting of clayey materials can be used to replace gravel as an aggregate in high-quality building concrete. If the concrete should be light in weight, granules of the lowest possible weight-to-volume ratio are applied: these granules must be sufficiently strong and show good adherence to the mortar, if the concrete is to have the desired strength. The granules should not absorb too much water, if the material is to be transported from a stationary concrete mixing plant ("premixed" concrete); this property also ensures that the concrete will soon reach a high compressive strength, which is a necessary requirement for prefabricated units of prestressed concrete.

For granules prepared from clayey materials there is a rough correlation between their volume-to-weight ratio on the one hand, and their strength, as well as the ultimate compressive strength of the concrete made with them, on the other. To reach a compressive strength of about 500 kg/cm$^2$ after 28 days' setting and hardening, concrete cubes having an edge of 10 cm and made of concrete showing the composition normal for building concrete, the granules used must have a volume-to-weight ratio of 1.2 – 1.5; see, for instance, "Beton, Herstellung und Verwendung", Beton-verlag, Duesseldorf, 16 (1966), 3, p. 4, FIG. 3. Granules of lower specific gravity have so far failed to effect such a compressive strength, at least if they were made of clayey materials.

After formation of the granules, the further preparation is carried out in a known way, by drying the granules and then heating them to the softening temperature of the clay, which results in a vitreous dense skin being formed around the granules. At the same time, gases cause the material — then plastic — to expand, so that it becomes porous. The size of the cavities in the porous structure, and the thickness of the walls between the cavities, ultimately determine the volume-to-weight ratio and the strength of the granules.

Another known way of preparing granules of low volume-to-weight ratio is mixing the clay, before formation of the granules, with organic or inorganic substances capable of creating cavities. Examples of such substances are foam plastics, sawdust, and carbon. The U.S. Pat. No. 2,699,409 mentions perlite as an aggregate. The addition of organic substances has the drawback that carbon is introduced into the clay, which results in an appreciable drop in strength, whereas addition of inorganic substances has the disadvantage that, to prepare light granules, such a quantity of relatively large particles has to be added that industrial-scale formation of granules from such a mixture becomes difficult.

Further, the Netherlands Patent Specification No. 91,469 describes a process for the preparation of a lightweight concrete aggregate from a mixture of coarse-grained shale, fine-grained shale, and relatively coarse-grained, ignited and porous shale. Heating to a sufficiently high temperature will then result in granules being formed from this material by sintering. The granules, consisting of the sintered mixture, have open pores and do not possess a dense skin, so that they can absorb much water, which is less desirable if a satisfactory concrete mix is to be made.

Finally, from "Concrete Technology and Practice" (1965), p. 462 and 463, as also from the U.S. Pat. No. 264,137, it is known that auxiliary materials can be added which upon heating yield gaseous components promoting the expansion of the clay heated to the softening point. If these materials are used, the cavities formed in the softened clay mass generally become too large.

The invention provides a process of preparing a granular aggregate for use in light-weight concrete objects and structures with avoidance of the abovementioned drawbacks and difficulties. According to the invention, use is made of a combination of two known auxiliary materials, the first being a porous inorganic material with open pores, added in an amount of 10–20 percent by volume with respect to the clayey material, and substantially having a grain size below 2 mm, and the second consisting of one or more substances that, upon heating, yield gaseous components at a temperature of over 800°C. This process makes it possible to prepare a granular aggregate suitable for making a concrete with a compressive strength of at least 300 kg/cm$^2$ and a volume-to-weight ratio of the granules of about 1.0 or even lower. The material obtained is very suitable for use in pre-stressed or other light-weight concrete structures.

The porous material forms nuclei for the expansion of the gases evolved by the second auxiliary at high temperature, which nuclei are homogeneously distributed throughout the clay. It is, consequently, possible to control the strength and the volume-to-weight ratio of the granules at will, through a proper choice of the number and size of the cavities in the granules and of the related thickness of the walls between the cavities. The number and the size of the cavities depend on the amount and the size of the porous inorganic material added, and on the amount of the second auxiliary(ies), which is adapted to that of the first. Thanks to the controlled structure, with homogeneous distribution of well-defined expansion cavities, it is further possible to obtain a stronger and denser skin than has so far been the case. Since, moreover, the porosity of the material causes some roughness of the granule surfaces, the granules will in general adhere better to the mortar than does gravel. The amount of porous inorganic material to be mixed with the clay is so low, and its grain size so small, that further processing to shaped granules does not meet with any difficulty.

As will appear from the examples — and this is an important advantage of the invention —, the effect, as regards the volume-to-weight ratio, is better than could be expected with addition of either of the auxiliary materials alone, and a given strength is obtained at a lower ratio. In the process of the invention, the process conditions are much less critical than in the known processes, since no demands are made on the "natural" expansion of the clay, and the size and number of the cavities are not left to chance.

In carrying out the process of the invention a non-expanding or weakly expanding clay may be used, although there is no need to do this. By preference use is made of a clay having a relatively high softening point and a high melting point, e.g. 1,350°C, and 1,600°C, respectively. However, it is also possible to start from weathered and/or ground slate or shale, the latter being the slaty refuse separated from the impure run-of-mine coal in a coal washery.

By preference use is made of a porous inorganic material having a softening temperature equal to or lower than that of the clayey material. This enables the inorganic material ultimately to deposit as a hard coating on the walls of the expansion cavities. Materials very suitable for the purpose are pumice and similar natural materials. Manufactured materials of the same kind can be used too, however. Further, owing to the presence of a porous inorganic material during the preparation, oxygen can easily penetrate to the inside of the granules formed. By heating in an oxidizing medium at a temperature over 550°C, preferably in the range of 550°C – 850°C, any carbon in the clayey material, the presence of which is undesirable, may be removed fairly rapidly, so that the granules of the end product are white, light grey, or possibly, red inside, unlike granules prepared by known processes, which are invariably black on the inside. Even FeO, which produces a black colouration of the inside, can easily be converted into an oxide of lighter colour.

Particularly suitable for use as the second auxiliary material is a material giving off gaseous components at a temperature close below the melting point of the porous silicate, for instance calcium sulphate. Other sulphates, sulphides, carbonates and the like, or combinations thereof, can also be used. The weight percentage of the second auxiliary material(s) in relation to the basic material need not be more than 5.

EXAMPLE I

This example relates to the preparation of an aggregate from a clay of the following analysis:

| | |
|---|---|
| loss on ignition | 8.6 % |
| $SiO_2$ | 61.7 % |
| sesquioxides | 23.8 % |
| CaO + MgO | 1.7 % |
| $Na_2O + K_2O$ | 4.2 % |
| bituminous components, calculated as C | 1.5 % |
| $Fe_2O_3$ | 2.1 % |
| softening point | 1,350 °C |
| melting point | 1,580 °C |

The porous material used was a white pumice, of the following analysis:

| | |
|---|---|
| softening point | 1,200 °C |
| melting point | 1,360 °C |
| grain size: | 90 % between 1 mm and ½ mm. |

Of this clay, spherical granules of about 8 g were formed, with the following composition:

A: clay only
B: 97.5 % wt of clay    2.5 % wt of gypsum
C: 95 % wt of clay      5 % wt of pumice
D: 92.5 % wt of clay    5 % wt of pumice, 2.5 % wt of gypsum.

The pre-dried granules were heated in an oxidizing medium at the rate of 30°C per minute, up to a temperature of 1,380°C, and kept at this temperature for 10 minutes. After cooling, the volume-to-weight ratio of the expanded granules was determined. Also the compressive strength was measured, by compressing the granules between two flat steel plates up to fracturing. The point load thus established at the round granules can be regarded only as a comparative value. The results were as follows:

| Composition | Volume-to-weight ratio after heating to 1380 °C | Permissible load kgf | Colour on inside |
|---|---|---|---|
| A | 1.35 | 110 | black |
| B | 1.25 | 129 | dark grey |
| C | 1.25 | 122 | light grey |
| D | 0.90 | 125 | white water absorption after 30 minutes: 3% |

The above figures show that addition of 5 percent by weight of pumice (composition C) does not suffice to effect an appreciable drop of the volume-to-weight ratio as compared with that of the clay-only granules. Neither does the use of gypsum alone (composition B) have a pronounced effect. However, combined addition of pumice and gypsum (composition D) to the clay results in an appreciable lighter granule of virtually the same strength.

With the use of these granules a structural concrete was composed containing 375 kg of Portland-B cement per cu.m and having a slump of about 8 cm. After 28 days the compressive strength of a cube having an edge of 10 cm was 595 kgf/cm². The weight by volume of the concrete was 1.68 kg/litre. The compressive strength of a 20 cm cube made from a concrete prepared with 375 kg of Portland B cement per cu.m and normal river gravel of exactly the same size distribution as the above granules amounted to 536 kgf/cm², and the weight by volume was 2.39 kg/litre. The material obtained by the process of the invention is highly suitable for use in prestressed concrete structures.

EXAMPLE II

In a semi-technical experiment use was made of the same clay as employed in example I, to which were added 7.5 percent wt of pumice (so-called "bims") with a size range of 1–½mm, and 2.5 percent wt of gypsum. After formation, on a rotary pelleting table, of granules of size fractions 3–7 mm and 7–15 mm, these granules were dried on a chain grate and slowly preheated in an oxidizing medium to a maximum temperature of 800°C. The preheated granules were then transferred to a rotary kiln and there heated to 1,370°C, after which they were rapidly cooled.

The resulting material, which was white inside, was tested in a building structure, the concrete for which had the following composition:

35 kg of Portland B cement 572 kg of river sand
48 kg of fine-grained sand
250 kg of 3–7 mm granules
400 kg of 7–17 mm granules,
and a slump of 8 cm.

The concrete mix had excellent handling characteristics, the weight by volume amount to 1.76 kg/litre, and the slump remained constant during transport, which indicates that the material did not absorb moisture.

The compressive strength of a 20 cm cube, measured at the building site, was as high as 388 kgf/cm$^2$ after only 7 days, and 415 kgf/cm$^2$ after 14 days. When, in a concrete of other wise the same composition, the above pellets were replaced by expanded shale from a coal mine, the compressive strength after 7 days was only 250 kgf/cm$^2$.

Since the concrete very rapidly assumes a high compressive strength, which later rises only very slowly, the material is very suitable for use in prefabricated building elements of prestressed concrete.

EXAMPLE III

Shale coming from a coal washery and showing a loss on ignition at 750°C of 30.9 percent, a softening point of 1250°C and a melting point of 1,450°C, was ground to a particle size below 0.2 mm. The particles were wetted and formed into granules of about 8 g of the following compositions:

E. shale only
F. 97.5 percent wt of shale and 5 percent wt of gypsum
G. 95 percent wt of shale and 5 percent wt of pumice, in the size range 1.0 mm – 0.1 mm
H. 92.5 percent wt of shale and 5 percent wt o pumice, of the size range 1.0 mm – 0.1 mm, and 2.5 percent wt of gypsum.

The pre-dried granules were heated in an oxidizing medium to about 750°C, and kept at this temperature for one hour until the carbon originally contained in them had completely disappeared. Thereupon, heating of the granules in the oxidizing medium was continued at the rate of 30°C per minute, up to 1,250°C, which temperature was maintained for 10 minutes. After cooling, the volume by weight and the strength of the expanded granules were determined.

| Composition | Weight by volume after heating to 1250 °C | Permissible load, kgf |
|---|---|---|
| E | 1.60 | 200 |
| F | 1.57 | 200 |
| G | 1.39 | 200 |
| H | 1.18 | 125 |

What is claimed is:

1. Process for preparing a granular aggregate for use in light-weight construction elements, comprising substantially uniformly mixing:
   A. an, at most, weakly expanding clayey material, chosen from the group consisting of non-expanding clay, weakly expanding clay, weathered slate, ground slate, weathered shale, ground shale and coal washery shale, having a relatively high softening point of at least about 1,350°C and a melting point of at least about 1,600°C;
   B. an open pored, porous, inorganic, silicious material consisting essentially of white pumice having a particle size measuring up to 2 mm. in width and present in an amount equalling 10–20 percent by volume of said clayey material; and
   C. at least one material consisting essentially of gypsum which, when heated to over 800°C, but below the melting point of said open pored, porous inorganic material, yields gaseous components, present in an amount equalling up to 5 percent by weight of said clayey material;
   granulating said mixture to produce granules having a range of sizes up to about 15 mm. across;
   heating the granules up to a temperature over 1,350°C at which said clayey material is softened and said one material gives off gas, expanding the gas from uniformly distributed quanta of said open pored, porous, inorganic material as nuclei;
   cooling the resultingly expanded granules to provide expanded granular aggregate having white or grey color on the walls of the expansion cavities formed by expanding said gas within said granules.

2. Process for preparing a granular aggregate for use in light-weight construction elements, comprising substantially uniformly mixing:
   A. a non-expanding clayey material, chosen from the group consisting of clay, weakly expanding clay, weathered slate, ground slate, weathered shale, ground shale and coal washery shale having a relatively high softening point of at least about 1,350°C and a melting point of at least about 1,600°C;
   B. an open pored, porous, inorganic, silicious material consisting essentially of white pumice having a particle size measuring up to 2 mm. in width and present in an amount equalling 10–20 percent by volume of said clayey material; and
   C. at least one material consisting essentially of gypsum which, when heated to over 800°C yields gaseous components, present in an amount equalling up to 5 percent by weight of said clayey material;
   granulating said mixture to produce granules having a range of sizes up to about 15 mm. across;
   heating the granules up to the softening temperature of said clayey material and over the temperature at which said one material gives off gas, expanding the gas from uniformly distributed quanta of said open pored porous, inorganic material as nuclei;
   cooling the resultingly expanded granules to provide expanded granular aggregate having white or grey color on the walls of the expansion cavities formed by expanding said gas within said granules.

* * * * *